United States Patent [19]

Fourqurean et al.

[11] Patent Number: 5,755,970
[45] Date of Patent: May 26, 1998

[54] METHOD FOR REDUCTION OF PIPELINE ACCUMULATION

[76] Inventors: George Earl Fourqurean; Michael Shane Fourqurean, both of 1714 Cessna, Midland, Tex. 79705

[21] Appl. No.: 567,959

[22] Filed: Dec. 6, 1995

[51] Int. Cl.$^6$ ................................................. B01D 35/06
[52] U.S. Cl. ..................................... 210/695; 210/748
[58] Field of Search .................................. 210/222, 243, 210/695, 748; 166/65.1, 66.5, 302, 304; 204/557; 138/33

[56] References Cited

U.S. PATENT DOCUMENTS

| | | | |
|---|---|---|---|
| 2,596,743 | 5/1952 | Vermeiren | 210/222 |
| 2,652,925 | 9/1953 | Vermeiren | 210/222 |
| 2,825,464 | 3/1958 | Mack | 210/222 |
| 2,937,710 | 5/1960 | Michael et al. | 183/7 |
| 2,939,830 | 6/1960 | Green et al. | 204/248 |
| 3,059,910 | 10/1962 | Moriya et al. | 261/72 |
| 3,170,871 | 2/1965 | Moriya et al. | 210/222 |
| 3,206,657 | 9/1965 | Moriya et al. | 317/201 |
| 3,228,868 | 1/1966 | Ruskin | 204/309 |
| 3,228,878 | 1/1966 | Moody | 210/222 |
| 3,349,354 | 10/1967 | Miyata et al. | 335/209 |
| 3,402,820 | 9/1968 | Lohmann | 210/222 |
| 3,511,776 | 5/1970 | Avampato | 210/222 |
| 3,585,122 | 6/1971 | King | 204/302 |
| 3,669,274 | 6/1972 | Happ et al. | 210/222 |
| 3,680,705 | 8/1972 | Happ et al. | 210/222 |
| 3,684,575 | 8/1972 | King | 134/1 |
| 3,947,533 | 3/1976 | Davis | 210/222 |
| 3,951,807 | 4/1976 | Sanderson | 210/222 |
| 4,146,479 | 3/1979 | Brown | 210/222 |
| 4,151,090 | 4/1979 | Brigante | 210/222 |
| 4,157,963 | 6/1979 | Jessop et al. | 210/222 |
| 4,188,296 | 2/1980 | Fujita | 210/222 |
| 4,210,535 | 7/1980 | Risk | 210/222 |
| 4,216,092 | 8/1980 | Shalhoob et al. | 210/222 |
| 4,229,389 | 10/1980 | Granger | 210/222 |
| 4,265,754 | 5/1981 | Menold | 210/222 |
| 4,326,954 | 4/1982 | Shroyer | 210/222 |
| 4,367,143 | 1/1983 | Carpenter | 210/222 |
| 4,428,837 | 1/1984 | Kronenberg | 210/222 |
| 4,485,012 | 11/1984 | Ehresmann | 210/223 |
| 4,543,186 | 9/1985 | Weisenbarger et al. | 210/221.2 |
| 5,074,998 | 12/1991 | Doelman | 210/97 |

OTHER PUBLICATIONS

Electomagnetic Fluid Conditioner, Magna–Flux, 1993, (2 pages).
Electromagnetic Fluid Conditioner Scale Control, Magna–Flux, 1995 (2 pages).
Linear Kinetic Cell Paraffin Control System, Enertec Inc., 1992 (4 pages).
New Horizons Unlimited, Enertec Inc. (2 pages).
Economical Low–Resistivity Grounding Backfill, Cathodic Engineering Equipment Co., Inc. (2 pages).
Scalewatcher Industrial, Electronic Descaling, Scalewatcher North Americal, Inc., 1976 (4 pages).

*Primary Examiner*—Matthew O. Savage
*Attorney, Agent, or Firm*—Crutsinger & Booth

[57] ABSTRACT

A method for increasing a negative bias of a ferrous-metal based pipeline having a connection to a ground plane for reducing the tendency of paraffins to accumulate on an inner surface of the pipeline. An electromagnetic field generator is provided. The electromagnetic field generator is connected to a positive terminal of a power supply. The electromagnetic field generator is also connected the ground plane spaced apart from the ground plane connection of the pipeline. A negative terminal of the direct current power supply is electrically connected to the pipeline.

15 Claims, 5 Drawing Sheets

METHOD FOR REDUCTION OF PIPELINE ACCUMULATION

TECHNICAL FIELD

This invention relates to oil field fluid treatment apparatus and in particular to fluid treatment apparatus to minimize paraffin accumulation within pipelines.

BACKGROUND OF THE INVENTION

In the pipeline transportation of fluids, a common concern is the accumulation of impurities, contaminants, or constituents on the inner walls of pipelines from crude, unprocessed fluids such as crude oil or other similar petroleum products. For example, paraffin or wax is a constituent or component of crude oil which has the tendency to collect on the internal surfaces of piping and pipelines. Accumulations of such constituents can rise to a level where a pipeline would be inoperable due to the congestion. The pipeline flow has to be interrupted to insert a "pig," or for applying a hot oil treatment or other pipeline servicing device or method is used to clear the blockage. Furthermore, the paraffin hardens, adding additional wear to such servicing devices such as pigs. Such servicing operations typically take several hours and are time consuming and expensive.

U.S. Pat. No. 4,326,954, issued to Shroyer, discloses a fluid treating apparatus. The fluid treatment apparatus is connected to the opposite ends of a tube by connectors to a fluid system. The apparatus utilizes an electrically generated magnetic field created by direct current flowing through a helical multi-layer winding. The apparatus is recited as being used to treat fluids to either inhibit build-up of sludge or scale or alter the consistency of the sludge or scale or to affect the flow of material. The apparatus is defined as comprising in part an elongated tube of non-magnetic material having an interior passageway.

A problem with fluid treatment devices is that heat build-up is so severe that the treatment device's protective sheathing melts, exposing the coils to the environment which may cause an open. When an electrical "open" occurs, then the entire field generator is inoperable and typically requires repair by first locating the open and then patching or splicing the open. In most cases, the field generator has a single electrical conductor wrapped in multi-layers about a the pipeline or a non-magnetic form. With such conventional assemblies, a serviceman cannot repair the unit without having to cut through the multiple layers of conductors to locate and access the open. This approach is not feasible to repair of the unit due to its required destruction before it can be repaired. Instead of repair for an open condition, the entire unit must typically be replaced with a new electromagnetic field generator.

An further problem with fluid treatment devices is that before installation is possible, the pipeline flow must be terminated so that a section of the pipeline can be removed. Such conventional devices are then installed In the space created by removed pipeline section. Additionally, pressure tests in some situations must be conducted before returning the pipeline to operational status, such as in oilfields where federal regulations requires such tests. When the flow has to be stopped, then revenue is lost, adding to the expense of such conventional devices.

Thus, a need exists for a device for the treatment of paraffin or other constituent build-up on the interior of the pipeline which can be mounted while the pipeline is in operation, and for a device that can be readily repaired or reconfigured to provide minimum down time.

SUMMARY OF THE INVENTION

A method of increasing a negative bias of a ferrous-metal based pipeline having a connection to a ground plane for reducing the tendency of paraffins to accumulate on an inner surface of the pipeline. An electromagnetic field generator is provided. The electromagnetic field generator is connected to a positive terminal of a power supply. The electromagnetic field generator is also connected the ground plane spaced apart from the ground plane connection of the pipeline. A negative terminal of the direct current power supply is electrically connected to the pipeline.

In a further aspect of the invention, a method of installing apparatus for reducing accumulation of paraffin on an inner surface of a pipeline without disrupting fluids within the pipeline is disclosed. A beveling machine with a spindle is provided. A spool having a length of an electrical conductor is provided which is rotatably mounted on the spindle. The beveling machine is mounted about the pipeline such that the spindle is adjacent and substantially parallel the pipeline. A first end of the electrical conductor is secured to the pipeline. The beveling machine is activated such that the spindle completes a plurality of revolutions about a center axis of the pipeline. The beveling machine is then deactivated.

Another aspect of the invention is an apparatus for reducing accumulation of paraffin on the inner walls of a ferrous-based metal pipeline which is used for the transport of fluids. The pipeline is electrically connected to a ground plane. The apparatus has an electromagnetic field generator, an anode member, and a negative terminal strap. The electromagnetic field generator is mounted to the pipeline and is electrically insulated from the pipeline. The electromagnetic field generator has a positive voltage terminal and a ground terminal. The positive voltage terminal is connectable to a positive terminal of a direct current power supply. The anode member is electrically connected to the ground terminal of the electromagnetic field generator for electrically connecting the ground terminal of said electromagnetic field generator to the ground plane. The negative terminal strap is for connecting the pipeline to a negative terminal of the direct current power supply.

These and other features, advantages, and objects of the present invention will be apparent to those skilled in the art upon reading the following detailed description of preferred embodiments and referring to the drawing.

BRIEF DESCRIPTION OF THE DRAWING

The accompanying drawing is incorporated into and forms a part of the specification to illustrate several examples of the present invention. The figures of the drawing together with the description serve to explain the principles of the invention. The drawing is only for the purpose of illustrating preferred and alternative examples of how the invention can be made and used and is not to be construed as limiting the invention to only the illustrated and described examples. The various advantages and features of the present invention will be apparent from a consideration of the drawing in which.

DETAILED DESCRIPTION OF PREFERRED EMBODIMENT

Figure 1:
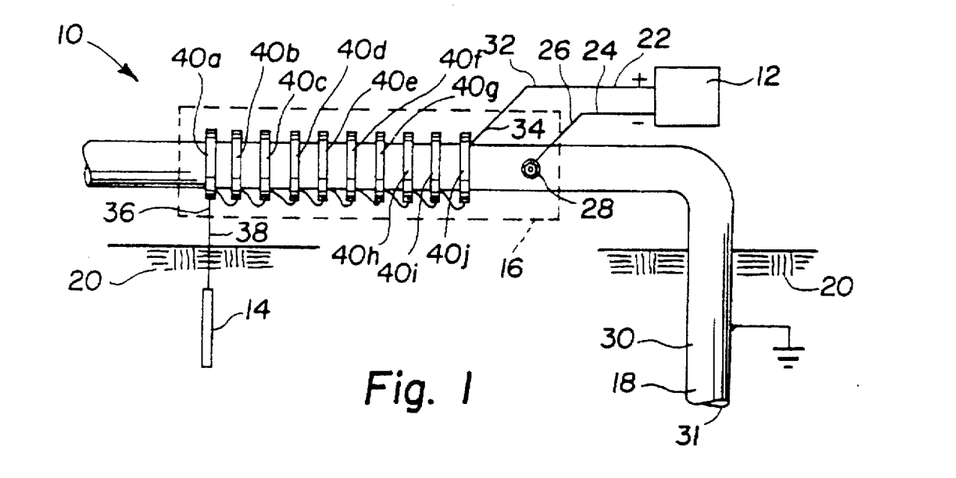
FIG. 1 is electrical schematic of an accumulation reduction device mounted to a pipeline.

Referring now to the drawing where like reference characters are used throughout the figures to refer to like parts. there is shown in FIG. 1 a contaminant accumulation reduction device generally designated by the numeral 10. Illustrated in FIG. 1, the accumulation reduction device 10 is installed on a ferrous-based metal pipeline 18 which is connected to an earth ground plane 20. Accumulation reduction device 10 comprises a direct current power supply 12, an anode member 14, and a electromagnetic field generator 16.

The direct current power supply 12 has a positive terminal 22 and a negative terminal 24. The negative terminal 24 is connected through a conductor 26 to the pipeline 18 at a pipeline terminal point 28. The conductor 26 can be connected to the pipeline 18 using any suitable electrical connecting method, such as a machine screw embedded in an outer surface 30 of the pipeline 18 or a metallic band tightened to electrically contact the outer surface 30 of the pipeline. The positive terminal 22 is connected through a conductor 32 to a first terminal 34 of the electromagnetic field generator 16.

The anode member 14 is electrically connected to the earth ground plane 20, which can be accomplished by driving the anode member 14 into the earth. The anode member 14 is formed of an electrically conductive, durable, corrosion resistant material. Preferably, the anode member is formed of a graphite resin-treated compound, but can also be formed of other conductive materials. For example, the size of the anode member 14 is about three inches in diameter by about twenty inches in length. The resistance of the anode member 14 with the surrounding earth or soil can be reduced by placing a petroleum-based coke product which is largely pure carbon between the anode member and the soil. The result is a positive, low resistance, electrical connection between the anode member 14 and the earth ground plane 20. An example of such a product is available under the tradename POWERFILL™ from Cathodic Engineering Equipment Co., Inc., of Hattiesburg, Miss. The anode member 14 is connected to a second terminal 36 of field generator 16 through conductor 38.

The electromagnetic field generator 16 has torodial coils 40 around the outer surface 30 of the pipeline 18 and electrically insulated with a dielectric material or film from the pipeline 18 such that an electrical current does not flow directly from the field generator 16 to the pipeline 18. As shown in FIG. 1, electromagnetic field generator 16 has a plurality of toroidal coils 40. More or fewer toroidal coils can be used depending on the size of the pipeline, the fluids transported through the pipeline or other such factors.

Figure 2:
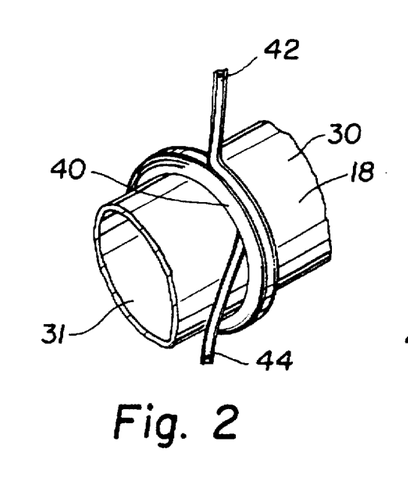
FIG. 2 is a detail perspective view of a toroidal coil.

Referring to FIG. 2, a toroidal coil 40 is shown. The term "toroidal" as used herein is meant to refer to the general doughnut shape of the coil. Such devices generate an electromagnetic field when excited by an electrical current, as described by Maxwell's equations of electromagnetivity. The toroidal coil 40 has a first conductor lead 42 and a second conductor lead 44. The first conductor lead 42 and the second conductor lead 44 are used to interconnect the plurality of coils 40 shown in FIGS. 5 and 6 in a desired electrical configuration. For example, shown in FIG. 1, the coils 40 are schematically illustrated as connected in a serial circuit configuration wherein the first conductor lead 42 of the coil 40a is connected to the first terminal 34 of the field generator 16 and the second conductor lead 44 of the coil 40j is connected to the second terminal 36 of the field generator 16. It should be noted that the coils 40 can also be embodied as conventional wrappings of insulated wire in discrete partitions similar in function to the toroidal coils 40. For example an insulated wire of about 14 awg ("american wire gauge") can be used to form these discrete partitions.

Figure 3:
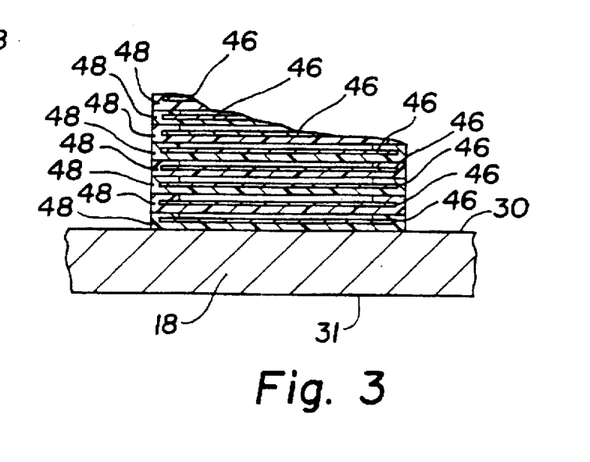
FIG. 3 is an enlarged partial sectional view of a toroidal coil.

Referring to FIG. 3, a detail of the layers of conductor 46 with electrically insulating film 48 stacked in a predetermined number of layers or turns which form the toroidal coils 40 is shown. The number of layers or turns depends on the number of amp-turn units desired. For example, it is believed that a one mile section of pipeline can be treated with coils providing about 150 amp-turns whereas a fifty mile length of pipeline can be treated using coils providing about 1000 amp-turns. A suitable number of turns per coil is about one-hundred and fifty, providing a resistance of about 1.5 ohms as measured across first conductor lead 42 and second conductor lead 44. With an power supply of about 28 VDC, the amperage of the current flowing through the electromagnetic field generator 16 is about 5.18 amps.

Figure 4:
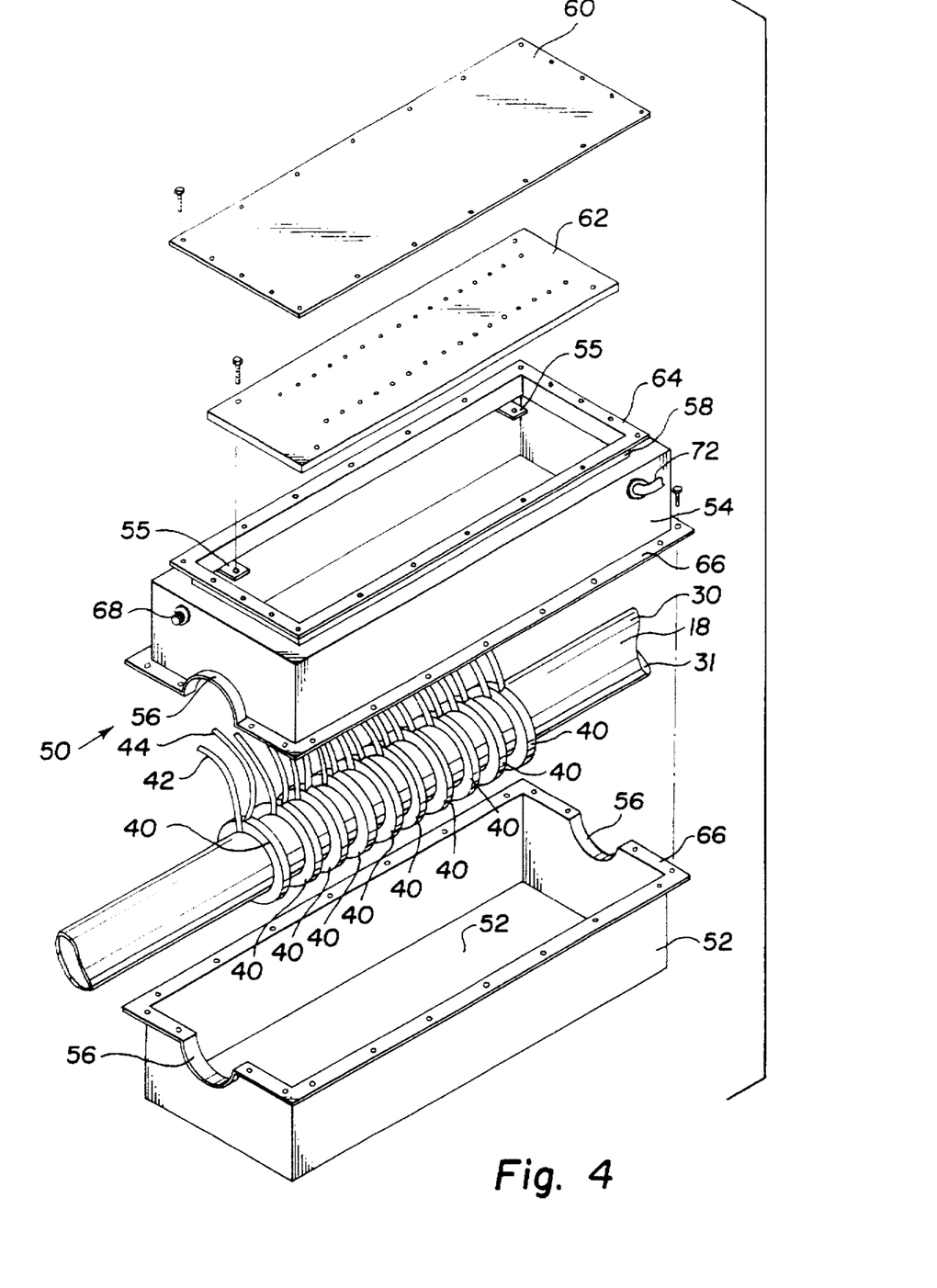
FIG. 4 is an exploded view of an electromagnetic field generator mounted to a pipeline.

Referring to FIG. 4, an electromagnetic field generator 16 having a bottom portion 52 and an upper portion 54 is shown. The general dimensions of the enclosure 50 are about thirty inches in length by about twelve inches in width by about twelve inches in height. These dimensions can be varied when necessary to accommodate varying pipeline diameters. Pipeline flange portions 56 extend from bottom portion 52 and upper portion 54. Flange portions 56 are adapted to cradle and engage pipeline 18. Neck portion 58 extends from upper portion 54. A dielectric routing board 62 nestles in the upper portion 54 and rests on ear tabs 55. A lid 60 fits over and is secured to the upper portion 54.

Figure 5:
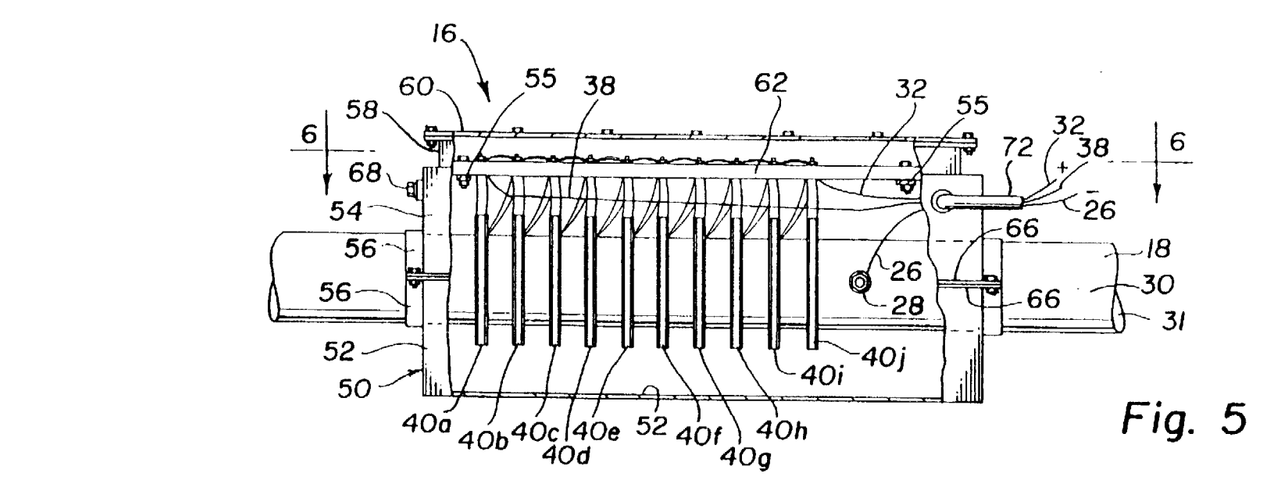
FIG. 5 is a side sectional view of an electromagnetic field generator with an enclosure mounted to a pipeline.

Referring to FIG. 5, when lid 60 is removed, an operator has access to a dielectric routing board 62. As shown, conductor leads 42 and 44 of each coil 40 is routed to the routing board 62 so that the coils can be electrically interconnected in a desired circuit configuration. For example, the coils can be electrically interconnected in a series relationship, in a parallel relationship, or a mixture of configurations, as dictated by the operator. Furthermore, if a coil 40 is damaged or in an open state, the coils 40 can be reconfigured through electrical connections with leads 74 on the routing board to bypass the faulty coils instead of installing another electromagnetic field generator 16.

An oil fill plug 68 is provided to allow an operator to fill the cavity 70 formed by the bottom portion 52 and the upper portion 54 with an electrically dielectric heat dissipating oil when the electromagnetic field generator 16 is in a substantially vertical orientation. Otherwise, the oil can be filled in the cavity 70 before the lid 60 is secured to the upper portion 54. Conductors 22, 38 and 26 are routed through conduit fixture 72. A gasket sealant is used for a fluid-tight seal of the flanges 64 and 66 with the pipeline 18. A suitable sealant is a silicone sealant due to its resistance to drying and its general capability to generate tight seals against leakage.

The lid 60 is mounted onto the neck portion flange 64 using nuts and bolts as shown. Similarly, the bottom portion 52 and the upper portion 54 are interconnected through flanges 66 using nuts and bolts or other securing means. It should also be noted that enclosure 50 can also be created through use of standard welding techniques, which can be used in non-secured areas of oilfields where fire is not a danger. The use of welding techniques would result in a reduction of manufacturing costs.

Figure 6:
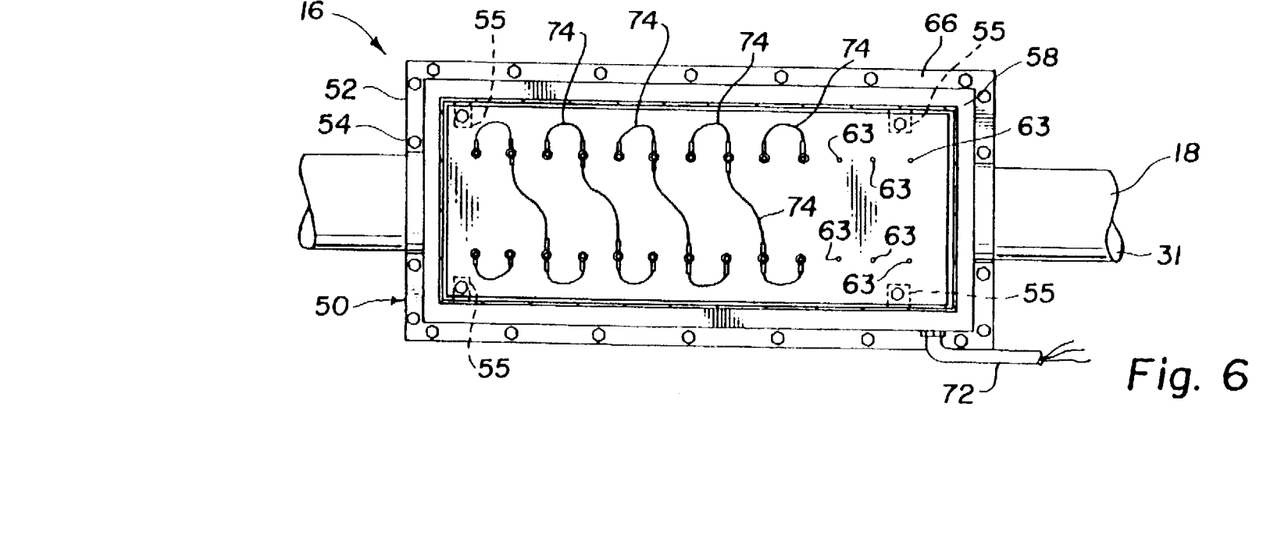
FIG. 6 is a cross-sectional view taken along line 6—6 of FIG. 5.

Referring to FIG. 6, the routing board 62 is shown as installed in the field generator 16. The routing board is formed of a dielectric material. Such boards having dielectric characteristics are available under the name BENELEX® from Masonite Corporation. Routing board 62 is mounted to the upper portion 54 through ear tabs 55 with nuts and bolts or other suitable securing means. Leads 74 are attached to the routing board 62 and the first and the second conductor leads 42 and 44 of each coil 40, respectively, with bolts and nuts or other similar means inserted through apertures 63 to create the desired electrical connections of the coils 40, as discussed earlier.

Figure 7:
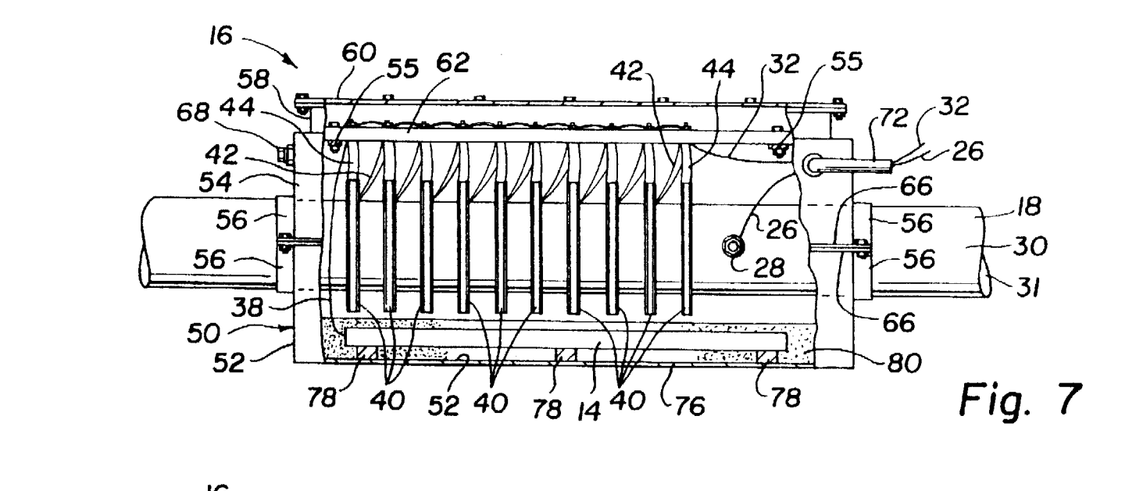
FIG. 7 is a side sectional view of another embodiment of the invention with an internal anode inside an enclosure.

Referring to FIG. 7, a further embodiment of an accumulation reduction device 10 having an internal anode is shown. The anode member 14 is spaced apart from a bottom surface 76 with dielectric spacers 78. Surrounding the anode member 14 is the petroleum-based coke product 80 mentioned earlier, which is substantially pure carbon. The coke product produces a low resistance connection with the earth ground plane 20 established by the pipeline 18. The advantage of such an embodiment is a self-contained unit with minimized installation time involved. Once the electrical configurations are made, then the heat dissipating dielectric oil can be added. The ground plane 20 is provided by the coke product 80 and the electrical contact with the anode member 14 and the pipeline 18 through the enclosure 50.

Figure 8:
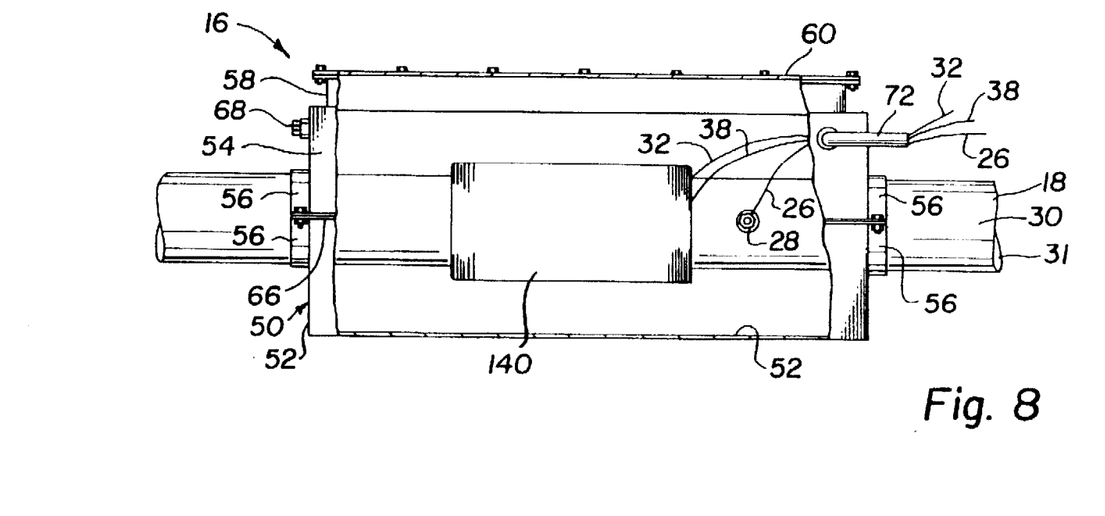
FIG. 8 is a side sectional view of an electromagnetic field generator with an insulated wire coil.

Referring to FIG. 8, another embodiment in which the coils are embodied as conventional wrappings 140 of insulated copper wire or other suitable conductor is shown. Equivalent magnetic fields are generated with such coils and such a embodiment is less expensive, but due to the amount of outer surface 30 required, is not as compact as use of the ribbon conductor 46.

The most preferred embodiment provides a two-tier treatment of fluids flowing through the pipeline 18. First, it is speculated, and the following description is not intended to limit the invention, that the negative potential charge of the pipeline 18 is further reduced by the electrical circuit of the accumulation reduction device 10, resulting in a greater repulsive relationship between the pipeline 18 and negatively charged or polarized constituents in the fluid being transported. The electrical circuit formed causes an electrical current flow from direct current voltage supply 12 to the anode member 14. An electrolytic flow of ions are conveyed through the earth ground plane 20 to the pipeline 18, completing the electrical circuit of the accumulation reduction device 10 with the voltage supply 12 through the negative terminal 24. For example, the naturally occurring potential measured from the pipeline to the earth ground plane 20 is from about a negative 0.350 milli-volts to about a negative 0.550 milli-volts before activation of the reduction device 10. After the reduction device is activated, the potential from the pipeline 18 to the earth ground plane 20 is increased or shifted approximately four-fold to about a negative 1.580 milli-volts. The potential shift is measurable from the reduction device 10 over at least several feet of the pipeline 18. Second, it is speculated that the electromagnetic field generator 16 provides a magnetic field which transcends the outer surface 30 of the pipeline 18 into the interior to influence constituents in the transported fluid. The influence of both aspects is believed to increase negative potential of the pipe which increases the repulsive force urging the anionic particles away from the inner surface of the pipe and to treat the fluid with the magnetic field. Such a result is highly desirable as the time required for maintaining and servicing these pipelines would be greatly reduced and provide an economic savings.

In an example of the accumulation reduction device performance, six-inch diameter pipelines, eighteen miles long, readily accumulate paraffin in certain oilfields. Such pipelines typically accumulate about five to about seven gallons of hard paraffin bi-weekly, requiring the pipeline oil production to be halted once a week while a scrapper or pig is sent down the length of the pipeline to remove the paraffin. With the accumulation reduction device installed, only about one gallon of paraffin was removed weekly. Additionally, the paraffin removed was softer and more malleable, thereby reducing wear on the pig. During the summer months, only one gallon of soft paraffin was removed when the pipeline was pigged monthly.

Figure 9:
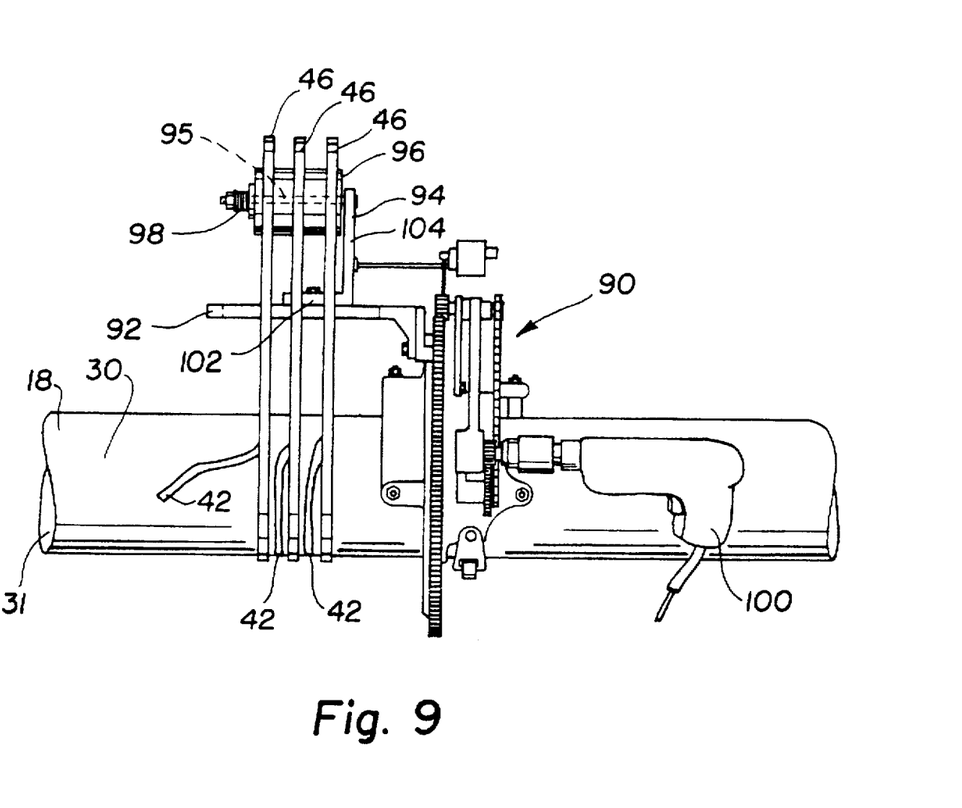
FIG. 9 is an illustration of an installation device for installing toroidal coils on the pipeline.

Referring to FIG. 9, an apparatus for the installation of the electromagnetic field generator on a pipeline 18 comprising a pipe beveling machine 90 having a torch holder arm 92, a spool mounting frame 94 having a spool spindle 95, a spool 96 and a tension spring 98 is shown. The apparatus allows installation of the electromagnetic field generator without having to first cease pipeline operations.

The beveling machine 90 is powered by a drill 100, which can be either powered by electricity or through an air hammer. The pipe beveling machine is commonly available in a variety of sizes to accommodate pipelines having different diameters for cutting oilfield pipeline with a cutting torch. The beveling machine 90 is slipped over the pipeline and secured. As illustrated in FIG. 9, placed on the torch holder arm 92 is a spool mounting frame 94. The spool mounting frame 94 is formed of a durable, strong material such as steel. The device is formed of a one-half inch flat plate bent to form a base portion 102 and a support portion 104. Spool spindle 95 is threadingly connected to the support portion 104 and extends outward at about ninety-degrees relative to the support portion 104. The spool 96 receives the spool spindle 95. A torsional force is provided by tension spring 98 attached to an end of the spindle 95 to maintain tension in the conductor 46 when being installed on the pipeline 18.

The description and figures of the specific examples above do not point out what an infringement of this invention would be, but are to provide at least one explanation of how to make and use the invention. Numerous modifications and variations of the preferred embodiments can be made without departing from the scope and spirit of the invention. Thus, the limits of the invention and the bounds of the patent protection are measured by and defined in the following claims.

Having described the invention, what is claimed is:

1. A method of increasing a negative bias of a ferrous-metal based pipeline having a connection to a ground plane for reducing the tendency of paraffins to accumulate on an inner surface of the pipeline, the method comprising the steps of:

providing an electromagnetic field generator for the pipeline, the electromagnetic field generator comprising at least one toroidal coil formed of an electrical conductor positioned around the pipeline and electrically insulated from the pipeline, and the at least one toroidal coil having a first terminal and a second terminal;

electrically connecting the first terminal of the electromagnetic field generator to a positive terminal of a direct current power supply;

electrically connecting the second terminal of the electromagnetic field generator to the ground plane such that the second terminal end is spaced apart from the pipeline; and electrically connecting a negative terminal of the direct current power supply to the pipeline, whereby the toroidal coil of the electromagnetic field generator produces an electromagnetic field.

2. The method of claim 1 wherein the at least one toroidal coil comprises:

a sufficient length of an electrically insulated ribbon conductor wrapped around the pipeline to provide a general toroidal form.

3. The method of claim 1 wherein the electromagnetic field generator comprises:

a single strand of electrically insulated conductor wound in a single layer along a length of the pipeline sufficient to induce a magnetic field of sufficient magnitude to affect a fluid passing through the pipeline.

4. The method of claim 1 further comprises the step of:

encasing and sealing the electromagnetic field generator with an enclosure around the pipeline.

5. The method of claim 4 further comprises the step of:

filling the enclosure with a heat dissipating dielectric oil to dissipate heat generated by a conversion of electrical energy to a quantity of heat energy caused by the electromagnetic field generator.

6. The method of claim 4 wherein the ground plane is contained within the enclosure.

7. A method of increasing a negative bias of a ferrous-metal based pipeline having a connection to a ground plane for reducing the tendency of paraffins to accumulate on an inner surface of the pipeline, the method comprising the steps of:

providing an electromagnetic field generator for the pipeline, the electromagnetic field generator comprising:

(a) a plurality of toroidal coils, each of the toroidal coils formed of an electrical conductor positioned around the pipeline and electrically insulated from the pipeline and having a first conductor lead and a second conductor lead, (b) a dielectric routing board providing a plurality of routing terminals electrically connected to each of the first and second conductor leads of at least one of the toroidal coils, and (c) a first terminal and a second terminal for the electromagnetic field generator; electrically interconnecting the plurality of routing terminals between the first terminal and the second terminal of the electromagnetic field generator;

electrically connecting the first terminal of the electromagnetic field generator to a positive terminal of a direct current power supply;

electrically connecting the second terminal of the electromagnetic field generator to the ground plane such that the second terminal end is spaced apart from the pipeline; and electrically connecting a negative terminal of the direct current power supply to the pipeline, whereby at least one of the toroidal coils of the electromagnetic field generator produces an electromagnetic field.

8. The method of claim 7 wherein the step of electrically interconnecting the plurality of routing terminals between the first terminal and the second terminal of the electromagnetic field generator further comprises: electrically interconnecting the plurality of terminals such that the toroidal coils are in a series electrical circuit configuration.

9. The method of claim 7 wherein the step of electrically interconnecting the plurality of routing terminals between the first terminal and the second terminal of the electromagnetic field generator further comprises: electrically interconnecting the plurality of terminals such that the toroidal coils are in a parallel electrical circuit configuration.

10. The method of claim 7 wherein the step of electrically interconnecting the plurality of routing terminals between the first terminal and the second terminal of the electromagnetic field generator further comprises: electrically interconnecting the plurality of terminals such that the toroidal coils are in an electrical circuit configuration having both a series and a parallel circuit elements.

11. A method of increasing a negative bias of a ferrous-metal based pipeline having a connection to a ground plane for reducing the tendency of paraffins to accumulate on an inner surface of the pipeline, the method comprising the steps of:

positioning at least one toroidal coil of an electrical conductor around the pipeline, the toroidal coil having a first terminal and a second terminal;

electrically insulating at least one toroidal coil from the pipeline;

electrically connecting the first terminal of the toroidal coil to a positive terminal of a direct current power supply;

electrically connecting the second terminal of the toroidal coil to the ground plane such that the second terminal end is spaced apart from the pipeline; and electrically connecting a negative terminal of the direct current power supply to the pipeline.

12. A method of increasing a negative bias of a ferrous-metal based pipeline which is connected to a ground plane for reducing the tendency of paraffins to accumulate on an inner surface of the pipeline, the method comprising the steps of:

positioning a plurality of toroidal coils of electrical conductor around the pipeline, each of the toroidal coils having a first conductor lead and a second conductor lead;

electrically insulating each of the toroidal coils from the pipeline;

electrically connecting each of a plurality of routing terminals of a dielectric routing board to each of the first and second conductor leads of at least one of the toroidal coils;

electrically interconnecting the plurality of routing terminals between a first terminal and a second terminal;

electrically connecting the first terminal to a positive terminal of a direct current power supply;

electrically connecting the second terminal to the ground plane such that the second terminal end is spaced apart from the pipeline; and electrically connecting a negative terminal of the direct current power supply to the pipeline, whereby at least one of the toroidal coils produces an electromagnetic field.

13. The method of claim 12 wherein the step of electrically interconnecting the plurality of routing terminals between the first terminal and the second terminal further comprises: electrically interconnecting the plurality of terminals such that the toroidal coils are in a series electrical circuit configuration.

14. The method of claim 12 wherein the step of electrically interconnecting the plurality of routing terminals between the first terminal and the second terminal further comprises: electrically interconnecting the plurality of terminals such that the toroidal coils are in a parallel electrical circuit configuration.

15. The method of claim 12 wherein the step of electrically interconnecting the plurality of routing terminals between the first terminal and the second terminal further comprises: electrically interconnecting the plurality of terminals such that the toroidal coils are in an electrical circuit configuration having both a series and a parallel circuit elements.

* * * * *

UNITED STATES PATENT AND TRADEMARK OFFICE
CERTIFICATE OF CORRECTION

PATENT NO. : 5,755,970
DATED : May 26, 1998
INVENTOR(S) : George Earl Fourqurean and Michael Shane Fourqurean It is certified that error appears in the above-identified patent and that said Letters Patent is hereby corrected as shown below:

In the Abstract, line 7 after the word "connected" insert - - to - -.

In Column 1, line 45 delete the word "the".

In Column 1, line 56 change the word "In" to - - in - -.

In Column 1, line 57 after the word "by" insert - - the - -.

In Column 2, line 61 after the word "is" insert - - an - -.

In Column 3, line 23 change the word "a" to - - an - -.

In Column 4, line 29 change the word "an" to - -a - -.

In Column 5, line 38 change the word "a" to - - an - -.

Signed and Sealed this

Twenty-second Day of September, 1998

Attest:

BRUCE LEHMAN

*Attesting Officer*   *Commissioner of Patents and Trademarks*